T. E. Harris,

Metal-Cutting Apparatus.

Nº 67,429.  Patented Aug. 6, 1867.

Witnesses:  Inventor:
Charles D. Robinson  T. E. Harris
N. J. Abrams

United States Patent Office.

THEODORE E. HARRIS, OF GREEN BAY, WISCONSIN.

Letters Patent No. 67,429, dated August 6, 1867.

IMPROVED PUNCHING APPARATUS.

The Schedule referred to in these Letters Patent and making part of the same.

TO ALL WHOM IT MAY CONCERN:

Be it known that I, THEODORE E. HARRIS, of Green Bay, in the county of Brown, and State of Wisconsin, have invented a new and useful Apparatus for Punching Holes in Shingle-Straps, so called; and I do declare that the following is a full, clear, and exact description of the construction and operation of the same, reference being had to the annexed drawing, making a part of this specification, in which—

Figure 1:
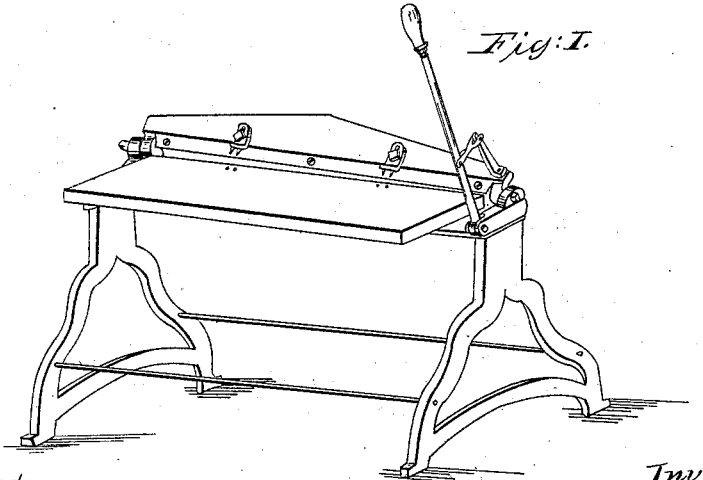

Figure 1 is a perspective view, showing a machine for cutting sheet iron and other metals, to which my punches are attached.

Figure 2:
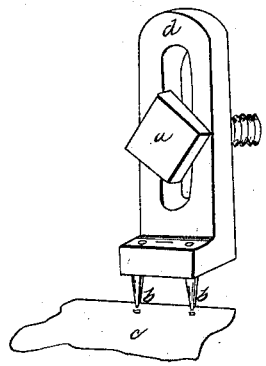

Figure 2, a perspective view of one of the punches $d$ with screw $a$ to attach it to the cutter-bar of the machine, with the punches fixed in place $b\ b$, and a section of the bed-plate of the cutting machine $c$, showing the holes corresponding to the punches.

This punching apparatus is made of wrought iron, except the punches, themselves, which are of steel. They are attached by screws, as shown, to the cutter-bar of the cutting machine, and their operation is the punching of two holes in each end of the shingle-strap at each downward movement of the cutter in cutting off the strap from the sheet of iron or other metal.

I claim the improved punching apparatus, substantially as herein described, and for the purpose set forth.

T. E. HARRIS.

Witnesses:
    CHAS. D. ROBINSON,
    C. D. SUYDAM.